United States Patent
Weeden et al.

(10) Patent No.: US 7,074,002 B2
(45) Date of Patent: Jul. 11, 2006

(54) PARTS CONTAINER WITH IN AND OUT CONVEYORS DRIVEN IN UNISON

(75) Inventors: Todd Michael Weeden, Strongsville, OH (US); David Andrew Sandor, Akron, OH (US)

(73) Assignee: Griswold Machine & Engineering Inc., Ravenna, OH (US)

(*) Notice: Subject to any disclaimer, the term of this patent is extended or adjusted under 35 U.S.C. 154(b) by 7 days.

(21) Appl. No.: 10/309,984

(22) Filed: Dec. 4, 2002

(65) Prior Publication Data
US 2004/0108184 A1 Jun. 10, 2004

(51) Int. Cl.
B69G 65/16 (2006.01)

(52) U.S. Cl. ............... 414/278; 414/285; 198/347.2
(58) Field of Classification Search ............ 198/347.2; 414/278, 285; 221/84, 85
See application file for complete search history.

(56) References Cited

U.S. PATENT DOCUMENTS

| | | | | |
|---|---|---|---|---|
| 972,350 | A | * | 10/1910 | Dupont ............... 221/77 |
| 3,263,857 | A | * | 8/1966 | Krakauer et al. ........ 221/85 |
| 3,716,165 | A | * | 2/1973 | Patrick ............... 221/85 |
| 3,756,455 | A | * | 9/1973 | Patrick ............... 221/85 |
| 3,759,417 | A | * | 9/1973 | Armstrong et al. ....... 221/85 |
| 3,831,807 | A | * | 8/1974 | Deaton et al. .......... 221/85 |
| 3,883,008 | A | | 5/1975 | Castaldi ............. 214/1 |
| 4,240,540 | A | | 12/1980 | Hobbs et al. .......... 198/492 |
| 4,361,411 | A | | 11/1982 | DiLiddo ............. 414/277 |
| 4,714,152 | A | | 12/1987 | Ross ................ 198/347 |
| 5,024,318 | A | | 6/1991 | Schwarze et al. ....... 198/465.2 |
| 5,074,096 | A | | 12/1991 | Focke ............... 53/133.5 |
| 5,176,242 | A | | 1/1993 | Wegscheider .......... 198/347.3 |
| 5,505,586 | A | | 4/1996 | Lichti .............. 414/786 |
| 5,588,790 | A | | 12/1996 | Lichti .............. 414/331 |
| 5,881,861 | A | | 3/1999 | Langen .............. 198/744 |
| 5,964,562 | A | | 10/1999 | Bernard, II et al. ..... 414/331.03 |
| 6,179,115 | B1 | | 1/2001 | de Guglielmo et al. ... 198/626.1 |
| 6,505,755 | B1 | * | 1/2003 | Voss ................ 221/192 |
| 6,539,280 | B1 | * | 3/2003 | Valiulis et al. ........ 700/236 |

* cited by examiner

*Primary Examiner*—Kathy Matecki
*Assistant Examiner*—Mark A. Deuble
(74) *Attorney, Agent, or Firm*—Howard & Howard (57) ABSTRACT

A container (10) includes a body that has a bottom wall (12), a top wall (20), a back wall (14), and first and second end walls (16), (18) wherein the walls (12), (14), (16), (18), and (20) of the body define an open front (22) portion of the container body. The container (10) further includes a first (24), top (98), bottom (100), side (110), and diagonal (112) conveyors supported on the back wall (14) within the container (10) for supporting parts (28) between the conveyors (24), (98), (100), and (112) for sequentially loading and unloading the parts (28) on and off the conveyors (24), (98), (100), and (112). The container (10) may provide for an effective way for loading and unloading the container with variety of parts comprising different shapes and dimensions.

41 Claims, 6 Drawing Sheets

PARTS CONTAINER WITH IN AND OUT CONVEYORS DRIVEN IN UNISON

BACKGROUND OF THE INVENTION

1. Field of the Invention

The subject invention relates to a container for storing parts.

2. Description of the Prior Art

Numerous containers for storing parts, storage systems, and mechanisms for storing and retrieving articles within the storage area are known in the prior art and are widely used today. U.S. Pat. Nos. 5,964,562 to Bernard, II et al and 5,024,318 to Schwarze et al., and disclose a variety of conveyors used in warehouses.

The U.S. Pat. No. 5,964,562 to Bernard, II et al. shows an apparatus for exchanging articles that includes an article holder, a vertical mast having a vertical mast axis and a shuttle ring assembly to hold the articles. The apparatus is designed for a warehouse usage. The U.S. Pat. No. 5,024,318 to Schwarze et al shows a conveyor track including carriers supported in the track for holding individual parts wherein each of the parts is supported by the carrier on top or bottom of the part. In addition to the prior art patents cited above, different conventional shipping containers for storing parts are known to be used in the industry today.

However, one of areas of continuous development and research is the area of a more advanced design of a convenient and compact storage container with an extra storage space that may provide for storing a wide variety of differently shaped parts that include solid and hollow portions.

BRIEF SUMMARY OF INVENTION

A container includes a body that has a bottom wall, a top wall, a back wall, and first and second end walls wherein the walls further define an open front portion of the container. The container is characterized by a first conveyor extending in a cantilevered fashion from the back wall to a distal end adjacent the open front within the container for supporting parts and sequentially loading and unloading the parts on and off the conveyor.

One of the advantages of the present invention provides for a convenient and compact storage container with an extra storage space. Still another advantage of the present invention provides for storing a wide variety of parts that comprise solid and hollow portions in the container, and ability of an operator to load and unload the parts wherein the operator is positioned outside the container.

Accordingly, the container shown in the present invention is new, efficient, and may provide for an effective way of loading and unloading the container with a variety of parts including different shapes and dimensions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
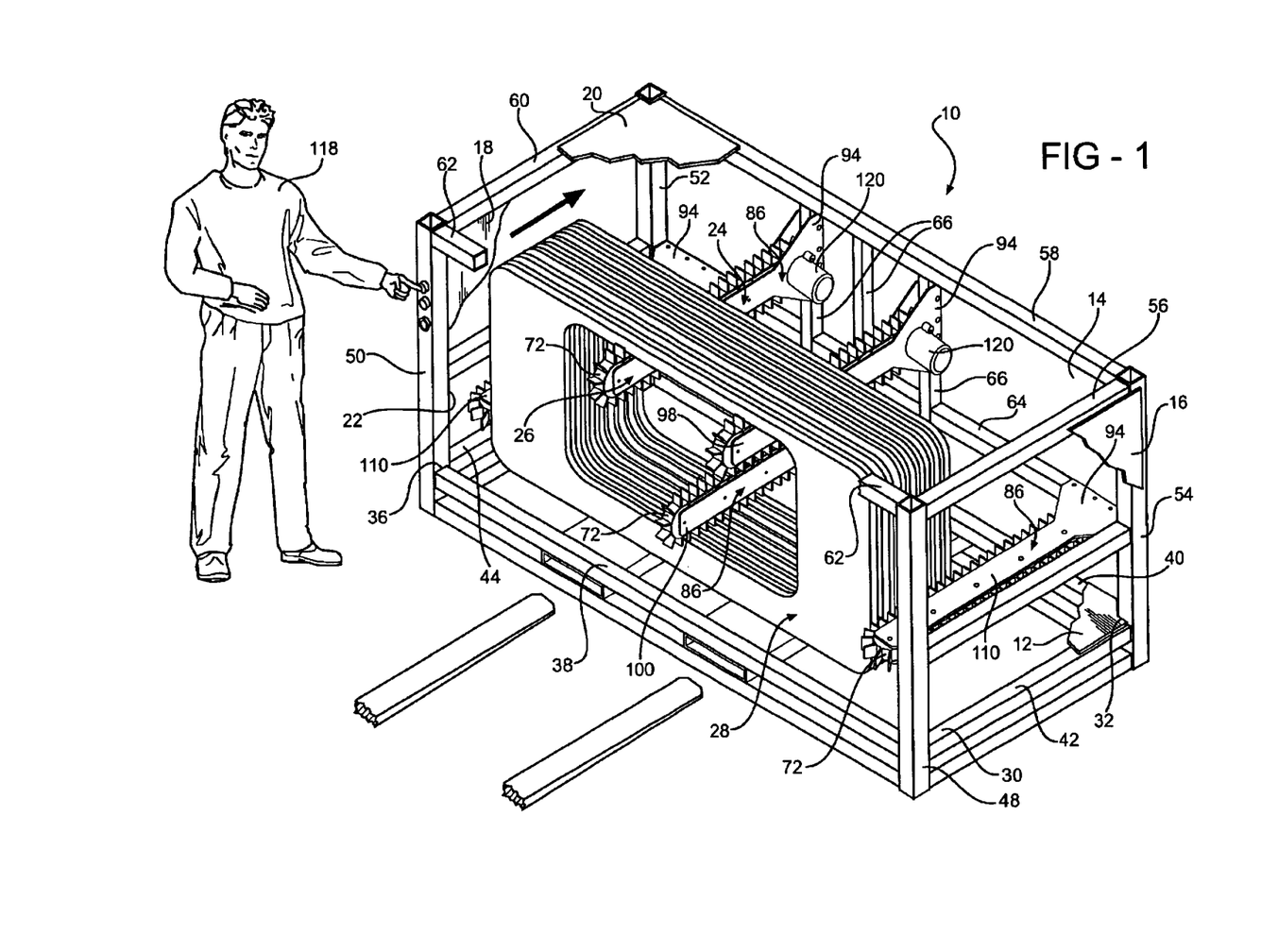
FIG. 1 is a perspective view of a container.

Referring to the FIGS. 1 through 6, wherein like numerals indicate like or corresponding parts throughout the several views, a container is generally shown at 10. As shown in FIG. 1, the container 10 may include a body that with a bottom wall 12, a back wall 14, and first and second end walls 16, 18, extending outwardly from the bottom wall 12 and interconnected by a top wall 20 to define an open front 22. The container 10 is characterized by a first conveyor, generally indicated at 24, extending in a cantilevered fashion from the back wall 14 to a distal end 26 adjacent the open front 22 within the container 10 for supporting parts, generally indicated at 28, and sequentially loading and unloading the parts 28 on and off the conveyor 24.

The bottom wall 12 of the container 10 includes four corners 30, 32, 34, 36 and includes front 38, back 40, and end 42, 44 beams interconnected at the corners 30, 32, 34, 36 wherein the bottom wall 12 is supported on the front 38, back 40 and end 42, 44 beams, respectively. Referring specifically to the structure of the beams, the front 38, back 40, and end beams 42, 44 comprise channels with a C-shaped cross-section.

The container 10 includes a pair of front 48, 50 and back 52, 54 vertical posts, respectively, at each of the corners 30, 32, 34, 36 of the bottom wall 12 extending upwardly from the intersection of the front 38, back 40, and end 42, 44 beams to respective tops. The front 48, 50 and back 52, 54 vertical posts are interconnected with front 56, back 58 and end 60, 62 top beams at their respective tops to support the top wall 20 positioned on the top beams 56, 58, 60, 62.

Figure 3:
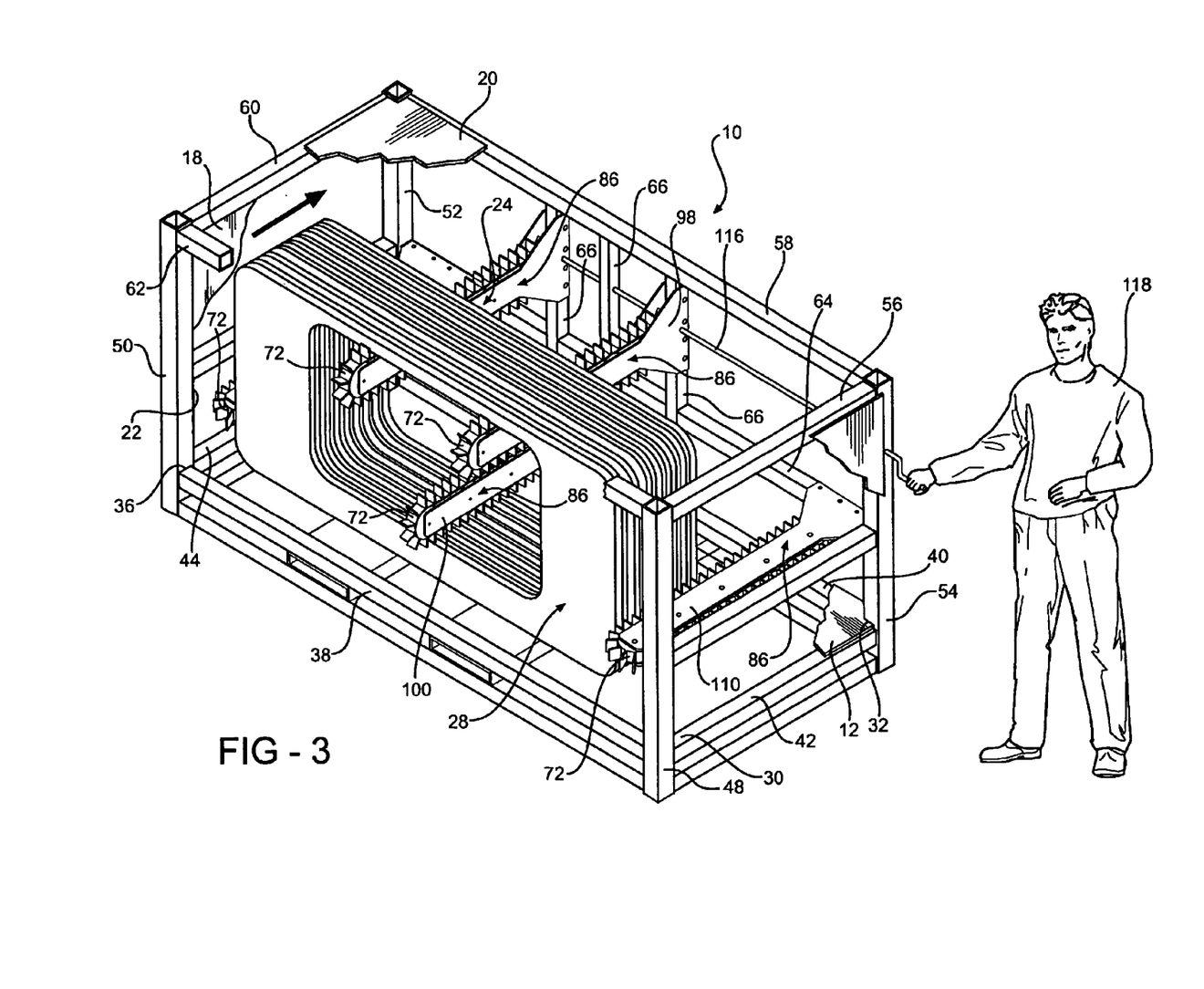
FIG. 3 is a perspective view of the container including a crank extending from the conveyor.
Figure 4:
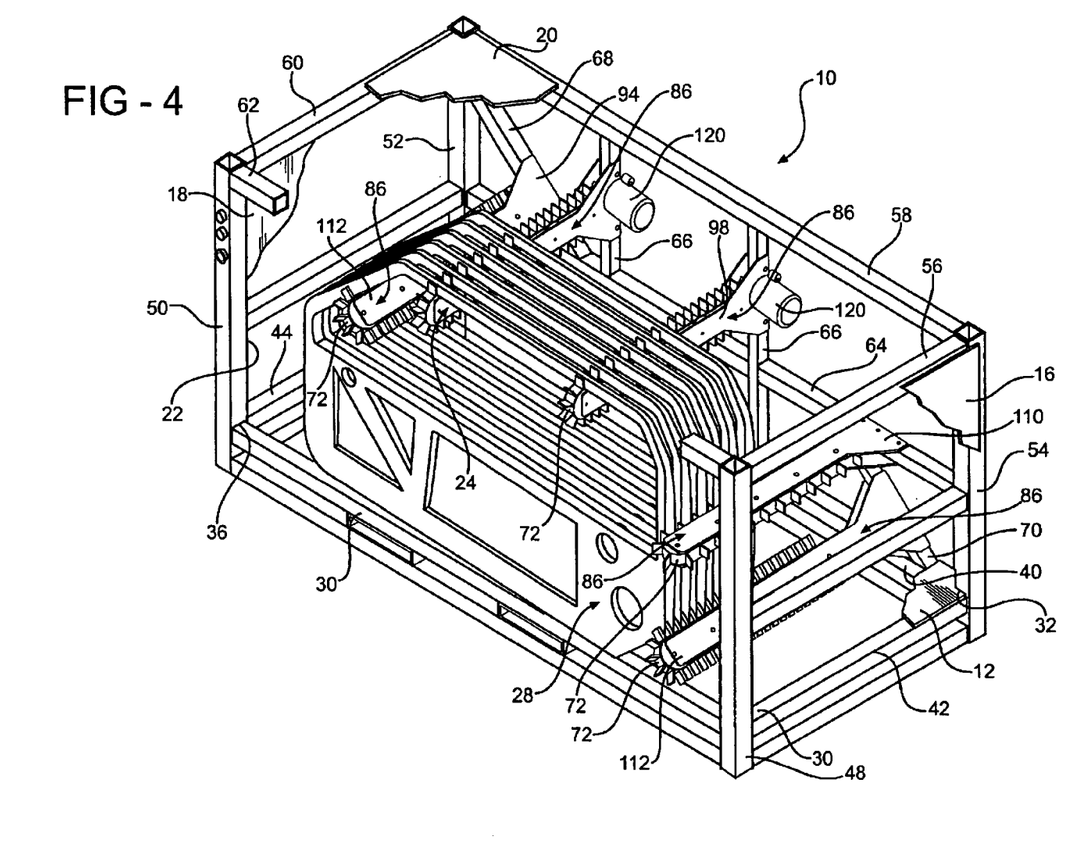
FIG. 4 is a perspective view of an alternative embodiment of the container that shows first, top, side, and diagonal conveyors.
Figure 5:
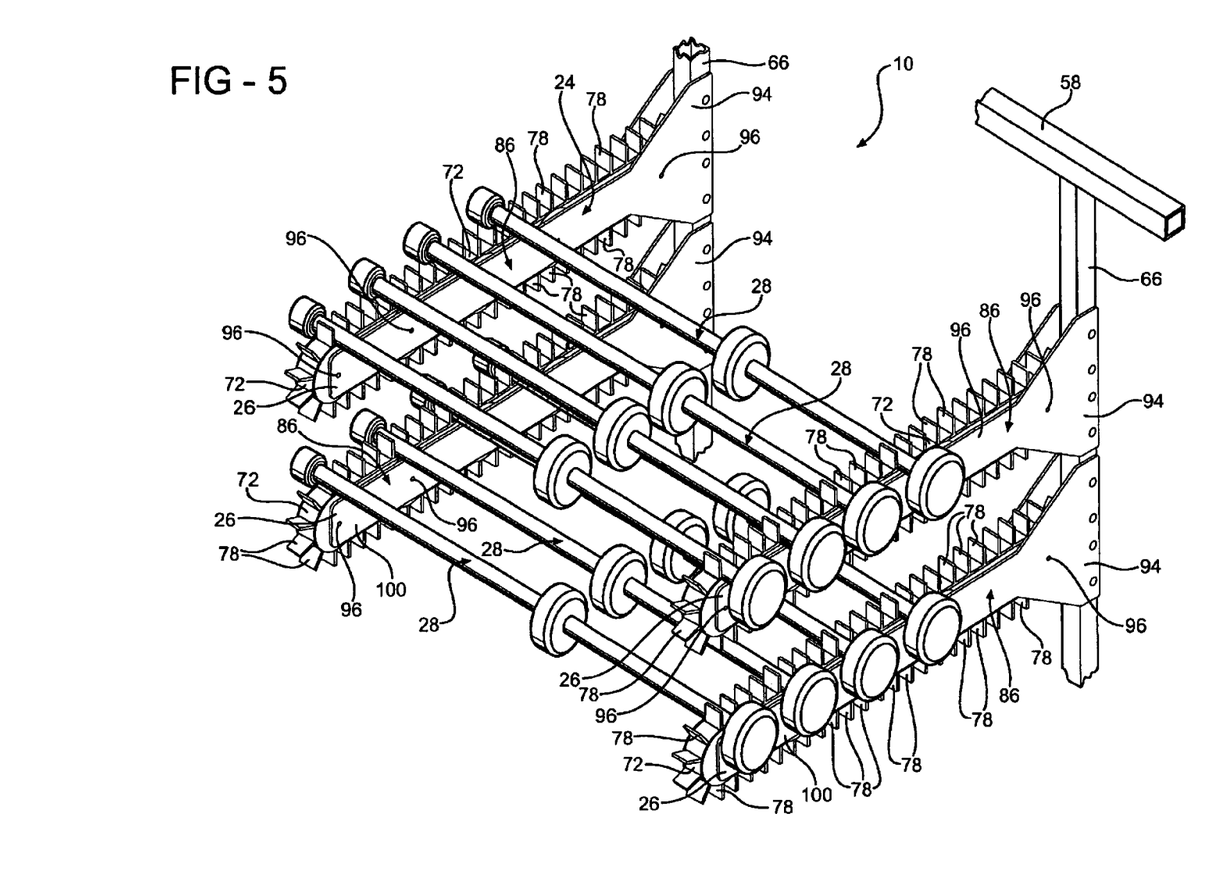
FIG. 5 is a perspective view of another alternative embodiment of the conveyors.

Shown in FIGS. 1, 3 and 4, the container 10 may include at least one supplemental beam 64 that extends between the back vertical posts 52, 54 wherein the supplemental beam 64 extends between the top 58 and bottom 40 beams. The container 10 includes at least one supplemental post 66 disposed between the back vertical posts 52, 54 and extending between the back top 56 and bottom 40 beams.

The container 10 may include at least one diagonal beam 68, as shown in FIG. 4, that extends between the back vertical post 54 and the supplemental beam 64 at the respective tops. In addition, the container may include at least one diagonal beam 70 that extends between the back vertical post 52 and the bottom beam 40 at the respective tops. The diagonal beam 68 comprises a hollow tube structure. The bottom 38, 40, 42, 44, the top 56, 58, 60, 62, the diagonal 68 beams and the vertical posts 48, 50, 52, 54 comprise a channel with a C-shaped cross-section.

Figure 2:
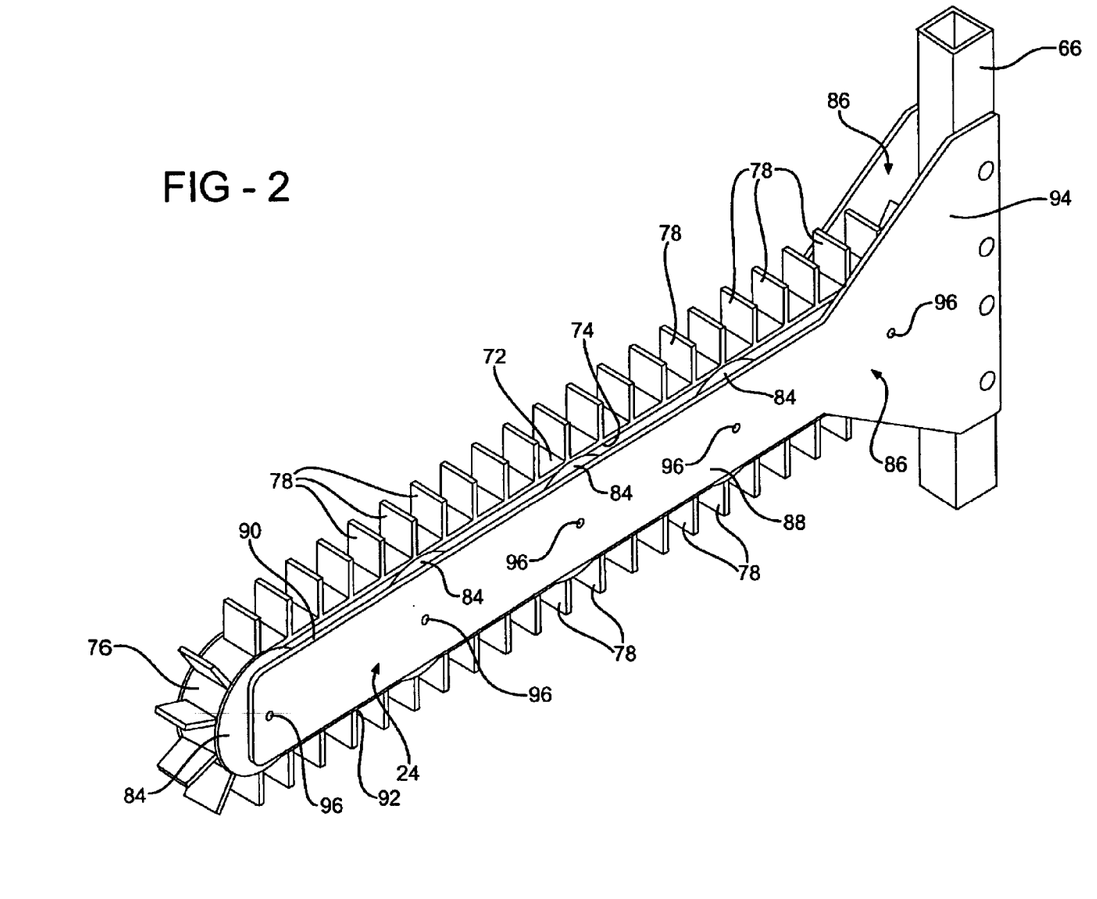
FIG. 2 is a perspective view of the conveyor supported on a supplemental post.
Figure 6:
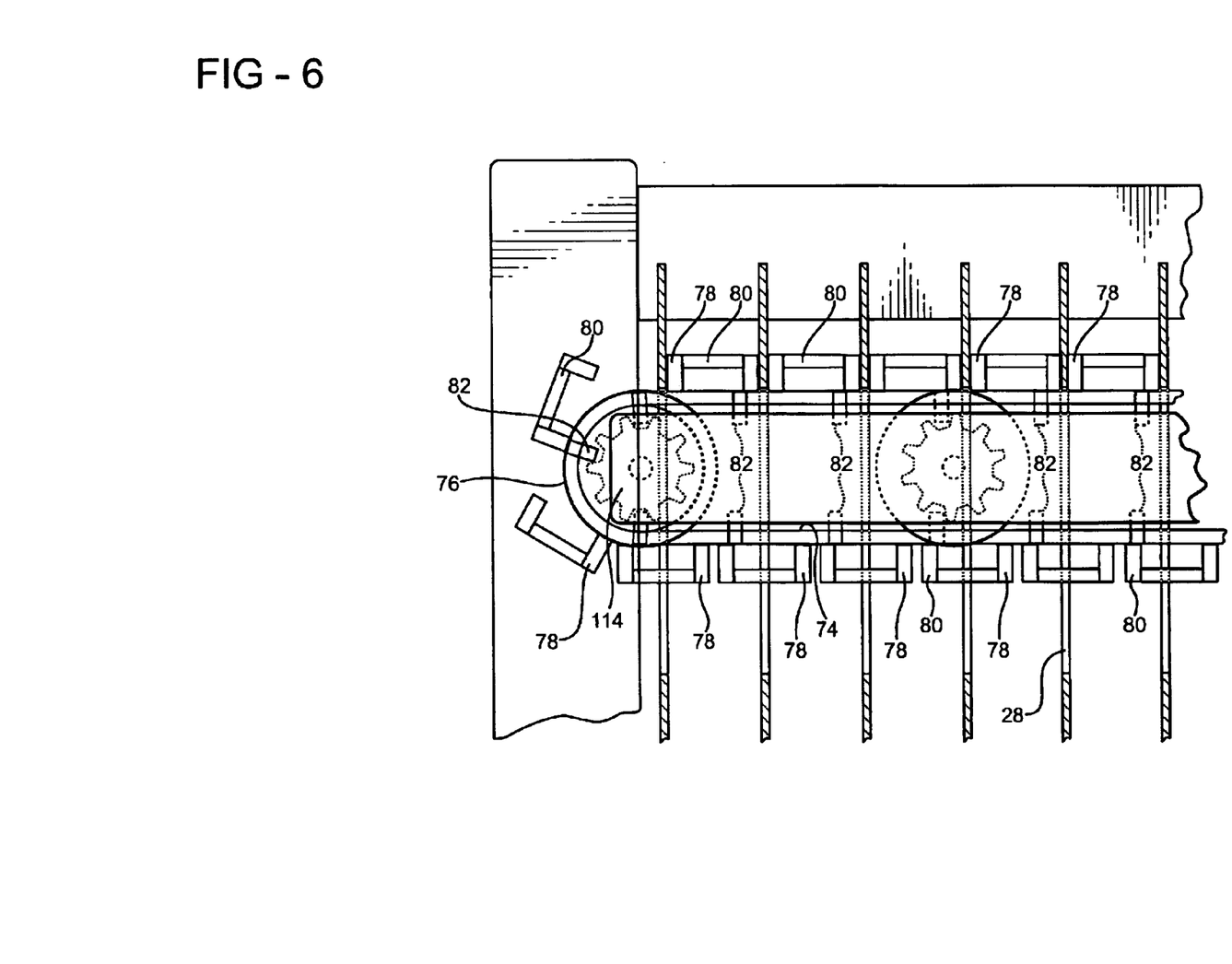
FIG. 6 is a side view of the conveyor that shows a belt entrained around a gear, a plurality of hooks extending from an outer surface of the belt, and a plurality of tabs extending from an inner surface of the belt to engage with the gear for sequentially moving the belt backward and forward during loading and unloading operations.

The first conveyor 24 extends in a cantilevered fashion from the back wall 14 and supported on the supplemental post 66. The first conveyor 24 includes a belt 72 that is disposed in an endless loop. As illustrated in FIGS. 2 and 6, the belt 72 presents an inner 74 and an outer 76 surface and includes a plurality of projections 78 extending outwardly and spaced from one another along the outer surface 76 for cradling the parts 28 between the projections 78. The projections 78 of the belt 72 extend outwardly to a hook 80 for retaining the parts 28 between and within the projections 78. The inner surface 74 of the belt 72 may include a plurality of tabs 82 spaced from one another and outwardly extending from said inner surface 74 of the belt 72. The belt 72 is entrained about a plurality of pulleys 84. The belt 72 may consist of a flexible material such as rubber, plastic, leather, and the like.

The conveyor 24 may include a pair of spaced booms, generally indicated at 86, to engage the pulleys 84 positioned between the booms 86. Each of the booms 86 includes a plate 88 having top 90 and bottom 92 edges spaced a distance less than the diameter of the pulleys 84 and an enlarged portion 94 adjacent the back wall 14 and extending a greater distance than the diameter of the pulleys 84. The booms 86 may include a plurality of axles 96 extending therebetween wherein each axle 96 supports one of the pulleys 84.

In one embodiment of the present invention, the container 10 may include at least one additional top conveyor 98 supported by and extending in a cantilevered fashion from the back wall 14 to the open front 22 within the container 10 and spaced from the first conveyor 24. The container 10 may include at least one additional bottom conveyor 100 supported on and extending in a cantilevered fashion from the back wall 14 to the open front 22 within the container 10 and positioned below the first conveyor 24. The top 98 and bottom 100 conveyors are supported on the supplemental post 66 that is disposed between the back vertical posts 52, 54 and extend between the back top 58 and bottom 40 beams of the container 10. The outer surface 76 of each of the first 24, top 98, and bottom 100 conveyor belts 72 face the top 20 and bottom 12 walls, respectively.

In another embodiment, the container 10 may include at least one additional side conveyor 110 supported on the vertical beam 64 and extending in a cantilevered fashion from the back wall 14 to said open front 22 within the container 10 wherein the side conveyor 110 is, spaced from the first conveyor 24. The outer surface 76 of the belt 72 of the side conveyor 110 faces the first 16 and second 18 end walls, respectively.

In still another embodiment, as shown in FIG. 4, the container 10 may include at least one diagonal conveyor 112 supported on the diagonal beam 68 and extending in a cantilevered fashion from the back wall 14 to the open front 22 within the container 10 with the outer surface 76 of the belt 72 thereof facing diagonally.

The container 10 may take the form of anyone of several embodiments for sequentially loading and unloading the parts 28 on and off the conveyor 24. In one embodiment, as illustrated in FIGS. 3 and 6, the container 10 may include a gear 114 positioned between the booms 86 to engage with the tabs 82 spaced from one another and outwardly extending from the inner surface 74 of the belt 72 and a crank 116 extending from the gear 114 for rotating the gear 114 manually around an axis. The crank 116 may be used by an operator 118 for rotating the conveyor belt 72 through the loop for moving the conveyor belt 72 for sequentially loading and unloading the parts 28 on and off the conveyor 24. In the alternative embodiment, as shown in FIG. 1, the container 10 may include an electric motor 120 mounted to the conveyor 24 to move the belt 72 for sequentially loading and unloading the parts 28 on and off the conveyor 24.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A container (10) for storing parts comprising:
   a body having bottom (12), top (20), back (14), and first (16) and second (18) end walls defining an open front (22);
   a first conveyor (24) extending in a cantilevered fashion from said back wall (14) to a distal end (26) adjacent said open front (22) within said container (10) for supporting parts (28) and sequentially loading and unloading the parts (28) on and off said conveyor (24);
   a second conveyor (98) supported by and extending in a cantilevered fashion from said back wall (14) to said open front (22) within said container (10) and spaced laterally from said first conveyor (24) for supporting parts (28) laterally across said conveyors (24, 98) for sequentially loading and unloading the parts (28) on and off conveyors (24, 98); and
   a drive mechanism (116, 120) for moving said conveyor (24, 98) in unison to move a part (28) supported laterally across said conveyors (24, 98) into and out of said container.

2. A container (10) as set forth in claim 1 wherein each of said first conveyors (24,98) includes a belt (72) disposed in an endless loop.

3. A container (10) as set forth in claim 2 wherein each conveyor (24, 98) includes a plurality of pulleys (84) with said belt (72) thereof entrained about said pulleys (84).

4. A container (10) as set forth in claim 3 wherein each conveyor (24, 98) includes a pair of spaced booms (86) and said pulleys (84) thereof are supported between said booms (86).

5. A container (10) as set forth in claim 4 including a plurality of axles (96) extending between said booms (86) with each axle (96) supporting one of said pulleys (84).

6. A container (10) as set forth in claim 4 wherein each of said booms (86) includes a plate (88) having top (90) and bottom (92) edges spaced a distance less than the diameter of said pulleys (84) and an enlarged portion (94) adjacent said back wall (14) and extending a greater distance than the diameter of said pulleys (84).

7. A container (10) as set forth in claim 2 wherein each belt (72) includes an inner (74) and outer (76) surface and a plurality of projections (78) extending outwardly from and spaced from one another along said outer surface (76) for cradling the parts 28 between said projections (78).

8. A container (10) as set forth in claim 7 wherein each of said projections (78) extend outwardly to a hook (80) for cradling the parts (28) between and within said projections (78).

9. A container (10) as set forth in claim 8 including a plurality of tabs (82) spaced from one another and extending from said inner surface (74).

10. A container (10) as set forth in claim 9 including a gear (114) positioned between said booms (86) of each conveyor (24, 98) to engage with said tabs (82) for moving said conveyor belt (72) for sequentially loading and unloading the parts (28) on and off said conveyors (24, 98).

11. A container (10) as set forth in claim 2 wherein said drive mechanism includes a crank (116) for manually rotating said conveyor belts (72) of both conveyors (24, 98) in unison through said loop for sequentially loading and unloading the parts (28) on and off said conveyors (24, 98).

12. A container (10) as set forth in claim 2 wherein said drive mechanism includes at least one electric motor (120) mounted to said conveyors (24, 98) to move said belts (72) thereof in unison for sequentially loading and unloading the parts (28) on and off said conveyors (24, 98).

13. A container (10) as set forth in claim 2 wherein said belt (72) consists of a flexible material.

14. A container (10) as set forth in claim 2 including at least one additional bottom conveyor (100) supported on and extending in a cantilevered fashion from said back wall (14) to said open front (22) within said container (10) and positioned below said first conveyor (24).

15. A container (10) as set forth in claim 14 wherein said outer surface (76) of each of said conveyor belts (72) faces said top (20) and bottom (12) walls, respectively.

16. A container (10) as set forth in claim 15 comprising at least one additional side conveyor (110) supported on and extending in a cantilevered fashion from said back wall (14) to said open front (22) within said container (10) and spaced from said first conveyor (24).

17. A container (10) as set forth in claim 1 including said bottom wall (12) includes four corners (30), (32), (34), (36).

18. A container (10) as set forth in claim 17 including at least one of front (38), back (40) and end (42), (44) bottom beams interconnected at said corners (30), (32), (34), (36) with said bottom wall (12) being supported on said bottom beams (38), (40), (42), (44).

19. A container (10) as set forth in claim 18 including a pair of front vertical posts (48), (50) and a pair of back vertical posts (52), (54) with one of said posts (48), (50), (52), (54) at each of said corners (30), (32), (34), (36) extending upwardly from the intersections of said front (38), back (40) and end (42), (44) beams to respective tops.

20. A container (10) as set forth in claim 19 including back (56), front (58) and end top (60), (62) beams interconnect said front (48), (50) and back (52), (54) vertical posts with said top wall (20) being supported on said back (56), front (58) and end top (60), (62) beams.

21. A container (10) as set forth in claim 20 including at least one supplemental post (66) disposed between said back vertical posts (52), (54) and extending between said back top (58) and bottom (40) beams wherein said supplemental post (66) supports said first (24), top (98) and bottom (100) conveyors.

22. A container (10) as set forth in claim 21 comprising at least one supplemental beam (64) extending between said back vertical posts (52), (54) wherein said supplemental beam (64) adjacently extends between said top (58) and bottom (40) beams wherein said supplemental beam (64) supporting said side conveyor (110).

23. A container (10) as set forth in claim 22 comprising at least one diagonal beam (68) extending between said back vertical posts (52) and said supplemental beam (64) at the respective tops and at least one diagonal beam (70) extending between said back vertical post (54) and said bottom beam (40) at the respective tops, said diagonal beam (68) supporting said diagonal conveyor (112).

24. A container (10) as set forth in claim 23 wherein each of said bottom (38), (40), (42), (44), top (56), (58), (60), (62), supplemental (64) and diagonal (68), (70) beams comprise a channel with a C-shaped cross-section.

25. A container (10) as set forth in claim 24 wherein said vertical (48), (50), (52), (54) and supplemental (66) posts comprise a channel with a C-shaped cross-section.

26. A container (10) as set forth in claim 1 wherein said container includes a plurality of interconnected beams (38, 40, 42, 44, 48, 50, 52, 54, 56, 58, 60 62, 64, 66, 68, 70), at least two of said beams defining posts (66) supporting said conveyors (24, 98) in said cantilevered fashion from said back wall (14).

27. A container (10) for storing parts comprising:
a body having (12), top (20), back (14), and first (16) and second (18) end walls defining an open front (22);
said container (10) characterized by a first conveyor (24) extending in a cantilevered fashion from said back wall (14) to a distal end (26) adjacent said open front (22) within said container (10) for supporting parts (28) and sequentially loading and unloading the parts (28) on and off said conveyor (24);
a second conveyer (98) supported by and extending in a cantilevered fashion from said back wall (14) to said open front (22) within said container (10) and spaced laterally from said first conveyor (24);
wherein each of said conveyors (24, 98) includes a belt (72) disposed in an endless loop;
at least one additional bottom conveyor (100) supported on an extending in a cantilevered fashion from said back wall (14) to said open front (22) within said container (10) and positioned below said first and second conveyors (24, 98);
said outer surface (76) of each of said conveyor belts (72) faces said top (20) and bottom (12) walls, respectively;
at least one additonal side conveyor (110) supported on and extending in a cantilevered fashion from said back wall (14) to said open front (22) within said container (10) and spaced from said first and second conveyors (24, 98); and
said outer surface (76) of said belt (72) of said side conveyors (110) face said first (16) and second (18) end walls, respectively.

28. A container (10) for storing parts comprising:
a body having bottom (12), top (20), back (14), and first (16) and second (18) end walls defining an open front (22);
said container (10) characterized by a first conveyor (24) extending in a cantilevered fashion from said back wall (14) to a distal end (26) adjacent said open front (22) within said container (10) for supporting parts (28) and sequentially loading and unloading the parts (28) on and off said conveyor (24);
a second conveyer (98) supported by and extending in a cantilevered fashion from said back wall (14) to said open front (22) within said container (10) and spaced laterally from said first conveyor (24);
wherein each of said conveyors (24, 98) includes a belt (72) disposed in an endless loop;
at least one additional bottom conveyor (100) supported on and extending in a cantilevered fashion from said back wall (14) to said open front (22) within said container (10) and positioned below said first and second conveyors (24, 98);
said outer surface (76) of each of said conveyor belts (72) faces said top (20) and bottom (12) walls, respectively,; and
at least one diagonal conveyor (112) supported on and extending in a cantilevered fashion from said back wall (14) to said open front (22) within said container (10) with said outer surface (76) of said belt (72) thereof facing diagonally.

29. A container (10) for storing parts comprising:
a body having bottom (12), top (20), back (14), and first (16) and second (18) end walls defining an open front (22);
a first conveyor (24) extending in a cantilevered fashion from said back wall (14) to a distal end (26) adjacent said open front (22) within said container (10);
a second conveyor (98) supported by and extending in a cantilevered fashion from said back wall (14) to said open front (22) within said container (10) and spaced laterally from said first conveyor (24) for supporting parts (28) laterally across said conveyors (24, 98) for sequentially loading and unloading the parts (28) on and off said conveyors (24, 98); and
each of said conveyors (24, 98) disposed in an endless loop facing said top wall (20); and
at least one additional side conveyor (110) supported on and extending in a cantilevered fashion from said back wall (14) to said open front (22) within said container (10) and spaced from said first and second conveyors (24, 98) and disposed in an endless loop facing one of said end walls (16, 18).

30. A container (10) as set forth in claim 29 wherein said wherein said container includes a plurality of interconnected beams (38, 40, 42, 44, 48, 50, 52, 54, 56, 58, 60 62, 64, 66, 68, 70), at least one of said beams (64) supporting said side conveyor (110) in said cantilevered fashion from said back wall (14).

31. A container (10) for storing parts comprising:
a body having bottom (12), top (20), back (14), and first (16) and second (18) end walls defining an open front (22);
a first conveyor (24) extending in a cantilevered fashion from said back wall (14) to a distal end (26) adjacent said open front (22) within said container (10);
a second conveyor (98) supported by and extending in a cantilevered fashion from said back wall (14) to said open front (22) within said container (10) and spaced laterally from said first conveyor (24) for supporting parts (28) laterally across said conveyors (24, 98) for sequentially loading and unloading the parts (28) on and off said conveyors (24, 98); and
each of said conveyors (24, 98) disposed in an endless loop facing said top wall (20); and
at least one diagonal conveyor (112) supported on and extending in a cantilevered fashion from said back wall (14) to said open front (22) within said container (10) and spaced from said first and second conveyors (24, 98) and disposed in an endless loop facing diagonally toward one of said end walls (16, 18) and one of said top (20) and bottom (12) walls.

32. A container (10) as set forth in claim 31 wherein said wherein said container includes a plurality of interconnected beams (38, 40, 42, 44, 48, 50, 52, 54, 56, 58, 60 62, 64, 66, 68, 70), at least one of said beams (70) supporting said diagonal conveyor (112) in said cantilevered fashion from said back wall (14).

33. A container for storing parts comprising:
a body having bottom, top, back, and first and second end walls defining an open front;

a first conveyor extending between said back wall said open front within said container for supporting parts and sequentially loading and unloading the parts on and off said conveyor;
a second conveyor supported extending between said back wall and said open front within said container and spaced from said first conveyor for supporting parts on said conveyors for sequentially loading and unloading the parts on and off conveyors;
said first conveyor disposed adjacent one of said walls and said second conveyor disposed adjacent another of said walls for supporting a part at spatially different positions within said container;
a first of said conveyors being spaced vertically above said bottom for supporting a part disposed between said bottom and said first conveyor; and
a drive mechanism for moving said conveyors in unison to move a part supported by said conveyors into and out of said container.

34. A container as set forth in claim 33 wherein each of said conveyors includes a belt disposed in an endless loop.

35. A container as set forth in claim 34 wherein said drive mechanism includes at least one electric motor connected to said conveyors to move said belts thereof in unison for sequentially loading and unloading the parts on and off said conveyors.

36. A container as set forth in claim 33 wherein said conveyors extend along one of said end walls between said backwall and said open front and including at least one additional conveyor disposed between said end walls and extending adjacent one of said bottom and said top.

37. A container as set forth in claim 33 wherein said second conveyor comprises a bottom conveyor extending between said back wall and said open front and positioned below said first conveyor.

38. A container as set forth in claim 33 wherein said second conveyor comprises a side conveyor supported extending along one of said end walls between said back wall and said open front.

39. A container as set forth in claim 33 wherein said container includes a plurality of interconnected beams, said beams supporting said conveyors.

40. A container as set forth in claim 33 including at least one diagonal conveyor extending between said back wall and said open front within said container and spaced form said first and second conveyors and disposed in an endless loop facing diagonally toward one of said end walls and one of said top and bottom walls.

41. A container for storing parts comprising:
a body having bottom, top, back, and first and second end walls defining an open front;
a plurality of conveyors extending between said back wall said open front within said container and spaced from one another spatially within the container for supporting apart at spaced positions;
a first of said conveyors being spaced vertically above said bottom for supporting a part disposed between said bottom and said first conveyor; and
a drive mechanism for moving all of said conveyors in said container in unison to move a part supported by said conveyors into and out of said container.

* * * * *

UNITED STATES PATENT AND TRADEMARK OFFICE
CERTIFICATE OF CORRECTION

| | | |
|---|---|---|
| PATENT NO. | : 7,074,002 B2 | |
| APPLICATION NO. | : 10/309984 | |
| DATED | : July 11, 2006 | |
| INVENTOR(S) | : Weeden et al. | |

It is certified that error appears in the above-identified patent and that said Letters Patent is hereby corrected as shown below:

In Column 6, line 5, Claim 26, delete "wherein said".

In Column 6, line 6, Claim 26, please add --,-- after "60".

In Column 6, line 27, Claim 27, delete "an" and please replace with --and--.

In Column 7, line 28, Claim 30, delete "wherein said".

In Column 7, line 29, Claim 30, please add --,-- after "60".

In Column 7, line 58, Claim 32, delete "wherein said".

In Column 7, line 59, Claim 32, please add --,-- after "60".

In Column 8, line 44, Claim 40, delete "as set forth in claim 33 including" and please replace with --for storing parts comprising:
    a body having bottom, top, back, and first and second end walls defining an open front;
    a first conveyor extending between said back wall said open front within said container for supporting parts and sequentially loading and unloading the parts on and off said conveyor;
    a second conveyor supported extending between said back wall and said open front within said container and spaced from said first conveyor for supporting parts on said conveyors for sequentially loading and unloading the parts on and off conveyors;
    a drive mechanism for moving said conveyors in unison to move a part supported by said conveyors into and out of said container; and--.

UNITED STATES PATENT AND TRADEMARK OFFICE
CERTIFICATE OF CORRECTION

PATENT NO. : 7,074,002 B2
APPLICATION NO. : 10/309984
DATED : July 11, 2006
INVENTOR(S) : Weeden et al.

It is certified that error appears in the above-identified patent and that said Letters Patent is hereby corrected as shown below:

In Column 8, line 47, Claim 40, delete "form" and please replace with --from--.

Signed and Sealed this

Thirty-first Day of July, 2007

JON W. DUDAS
*Director of the United States Patent and Trademark Office*